United States Patent
Bradley et al.

(10) Patent No.: US 6,341,068 B1
(45) Date of Patent: Jan. 22, 2002

(54) LOW PROFILE CONNECTOR SYSTEM FOR PROVIDING MULTIPLE DRIVES ON A CARD

(75) Inventors: Ed Bradley, Richardson; Melvin G. Peel, Jr., Plano; Hadi M. Hayek, Euless; Ignacio Linares, Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/541,471

(22) Filed: Mar. 31, 2000

(51) Int. Cl.⁷ ................................................ H05K 1/14
(52) U.S. Cl. ...................... 361/736; 361/742; 361/758; 174/76.1
(58) Field of Search ................................. 361/736, 685, 361/686, 788, 797, 720, 742, 758, 770, 804, 807, 808, 809, 748, 728, 729; 439/505, 623, 651, 851, 76.1; 174/138 G

(56) References Cited

U.S. PATENT DOCUMENTS

| | | | |
|---|---|---|---|
| 5,195,022 A | * 3/1993 | Hoppal et al. | 361/391 |
| 5,518,418 A | * 5/1996 | Larabell | 439/505 |
| 5,680,065 A | * 10/1997 | Park | 326/86 |
| 5,745,795 A | * 4/1998 | Pecone et al. | 395/882 |
| 5,751,977 A | * 5/1998 | Alexander | 395/306 |
| 6,112,276 A | * 8/2000 | Hunt et al. | 711/112 |

OTHER PUBLICATIONS

Force Computers, "Compact vs. Industrial PC's", Jan. 1997, pp. 1–19.
Fischer, Wayne, "Compact PCI—Next–Generation Bus Architecture", Feb. 1998, pp. 106–109.
PCI Industrial Computers, "CompactPCI Specification", Oct. 1999, pp. 9–61.

* cited by examiner

Primary Examiner—Jeffrey Gaffin
Assistant Examiner—Hung Bui
(74) Attorney, Agent, or Firm—Smith, Danamraj & Youst, P.C.

(57) ABSTRACT

A storage card module for supporting more than one SCSI storage device on a printed circuit board to be coupled to a CPCI backplane. The storage devices are positioned on the board with a predetermined spacing disposed therebetween. One or more low profile connectors are disposed in the predetermined spacing for each storage device depending on the number of pins needed. For an 8-bit fast tape drive, a 50-pin low profile connector is utilized. A pair of 34-pin low profile connectors are utilized for connecting to a 16-bit fast-wide SCSI disk drive. Electrical traces are buried in the board substrate which couple the low profile connectors to a card connector on the printed circuit board. The card connector is mated to the CPCI backplane via a backplane connector. A SCSI I/O interface is in an electrical conductive relationship with at least a portion of the backplane connector. Power is provided to the drives via a pair of 4-pin low profile power connectors disposed in the predetermined spacing.

20 Claims, 5 Drawing Sheets

LOW PROFILE CONNECTOR SYSTEM FOR PROVIDING MULTIPLE DRIVES ON A CARD

CROSS-REFERENCE TO RELATED APPLICATION(S)

This application discloses subject matter related to the subject matter disclosed in the following co-assigned patent application(s): (1) "Card Design Having Tape and Disk Drives," filed Mar. 31, 2000, Ser. No.: 09/539,759, in the name(s) of: Ignacio Linares and Serge Fourcand.

BACKGROUND OF THE INVENTION

1. Technical Field of the Invention

The present invention relates to form factor designs for providing storage devices as a Printed Board Assembly on a backplane and, more particularly, to a storage card design that is compatible with the Compact Peripheral Component Interconnect (CPCI) standard. Preferably, the card design is implemented in a subrack of a network element (e.g., a Next Generation Signaling Transfer Point (STP)) disposed in a Signaling System No. 7 (SS7) network.

2. Description of Related Art

The exponential increase in the number of local telephone lines, mobile subscribers, pages, fax machines, and other data devices, e.g., computers, Information Appliances, etc., coupled with deregulation that is occurring worldwide today is driving demand for small form factor, high capacity STPs which must be easy to maintain, provide full SS7 functionality with so-called "five nines" operational availability (i.e., 99.999% uptime), and provide the capability to support future functionality or features as the need arises. Further, as subscriber demand for more service options proliferates, an evolution is taking place in the telecommunications industry to integrate Intelligent Network (IN)-capable Service Control Point (SCP) functionality within STP nodes.

While it is generally expected that a single platform that supports large-database, high-transaction IN services as well as high-capacity packet switching (hereinafter referred to as a signaling server platform) will reduce equipment costs, reduce network facility costs and other associated costs while increasing economic efficiency, those skilled in the art should readily recognize that several difficulties must be overcome in order to integrate the requisite functionalities into a suitable network element that satisfies the stringent performance criteria required of telecommunications equipment. Daunting challenges arise in designing a compact enough form factor that is efficiently scalable, ruggedized, and modularized for easy maintenance, yet must house an extraordinary constellation of complex electronic circuitry, e.g., processors, control components, timing modules, I/O, line interface cards which couple to telephony networks, etc., that is typically required for achieving the necessary network element functionality. Whereas the electronic components may themselves be miniaturized and modularized into cards or boards that can be interconnected via suitable backplanes, implementing the requisite functionality within a stringent form factor poses many obstacles.

It should be apparent to those skilled in the art that because backplanes typically have a rigid slot budget, i.e., the number of slots available for connecting cards thereto, consuming as few slots as possible while still accomplishing applicable functional objectives gives rise to a significant design challenge. This is particularly so in the context of providing high-speed media storage in the form of cards required to be disposed on a backplane. Not only is the backplane's slot budget is a major concern, the form factor of the storage devices itself gives rise to additional complications. Typically, the size of such devices, e.g., disk drives, tape drives, etc., is bulky in relation to the available card space, and where multiple storage devices are required, such functionality is conventionally accomplished by providing a storage card assembly that is about three or more slots in width.

Further, conventional backplane arrangements for supporting storage I/O interfaces are beset with numerous additional deficiencies and drawbacks as well. In the existing solutions, for example, the bus slot that is to receive a storage I/O card is hardwired to accept only that particular type of storage device and typically will not work with other storage devices without extensive modifications which may include both electrical and mechanical aspects. That is, a bus slot designed for a tape drive card will not accept a disk drive card and vice versa.

Moreover, if it is required for some reason that a storage bus slot be used not for storage cards but for some other functionality, e.g., processing element functionality, the existing backplanes cannot accommodate such requirements. Thus, once a bus slot is formed for a particular purpose and device, there is very little that can be done with the arrangement if future needs require replacement or a change in the use of the slot. Consequently, adaptability of a system having such conventional bus slot arrangements is severely impacted.

SUMMARY OF THE INVENTION

Accordingly, the present invention is directed to a storage card module that is no wider than two Compact Peripheral Component Interconnect (CPCI) slots on a backplane yet advantageously provides more than one high speed storage device on a card substrate. The storage card module comprises a printed circuit board (PCB) provided as a front panel card in accordance with the CPCI bus standard, wherein the PCB supports traces that extend from the PCB's card connector that is matched to at least one backplane connector disposed on the CPCI backplane. The backplane connector is coupled to an input/output (I/O) bus interface which preferably comprises a Small Computer System Interface (SCSI) bus interface.

In accordance with the teachings of the present invention, a first storage device is positioned on the PCB with a first predetermined spacing disposed therebetween. Similarly, a second storage device is also positioned on the PCB with a second predetermined spacing disposed therebetween. At least one low profile connector is disposed in each of the first and second predetermined spacings, wherein the low profile connector(s) is (are) coupled to the card connector via at least a portion of the traces supported by the PCB. In a preferred exemplary embodiment, the traces are buried in the PCB substrate and extend from the card connector to the low profile connectors. A flexible ribbon cable is disposed between the low profile connector(s) and a corresponding storage device, i.e., the disk or tape drive, for providing an electrical path therebetween. Also disposed in the predetermined spacing are a pair of low profile power connectors for supplying power to the SCSI drives, which low profile power connectors are also coupled to the card connector via at least a portion of the buried traces.

In a presently preferred exemplary embodiment of the present invention, the tape drive comprises an 8-bit fast SCSI tape drive with a 50-pin interface that is coupled to a single 50-pin low profile connector via an unbranched ribbon cable. The disk drive preferably comprises a 16-bit fast-wide SCSI disk drive with a 68-pin interface. Accordingly, two low profile connectors each having 34 pins are provided such that a Y-forked flexible ribbon cable connects the low profile connectors to the disk drive.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
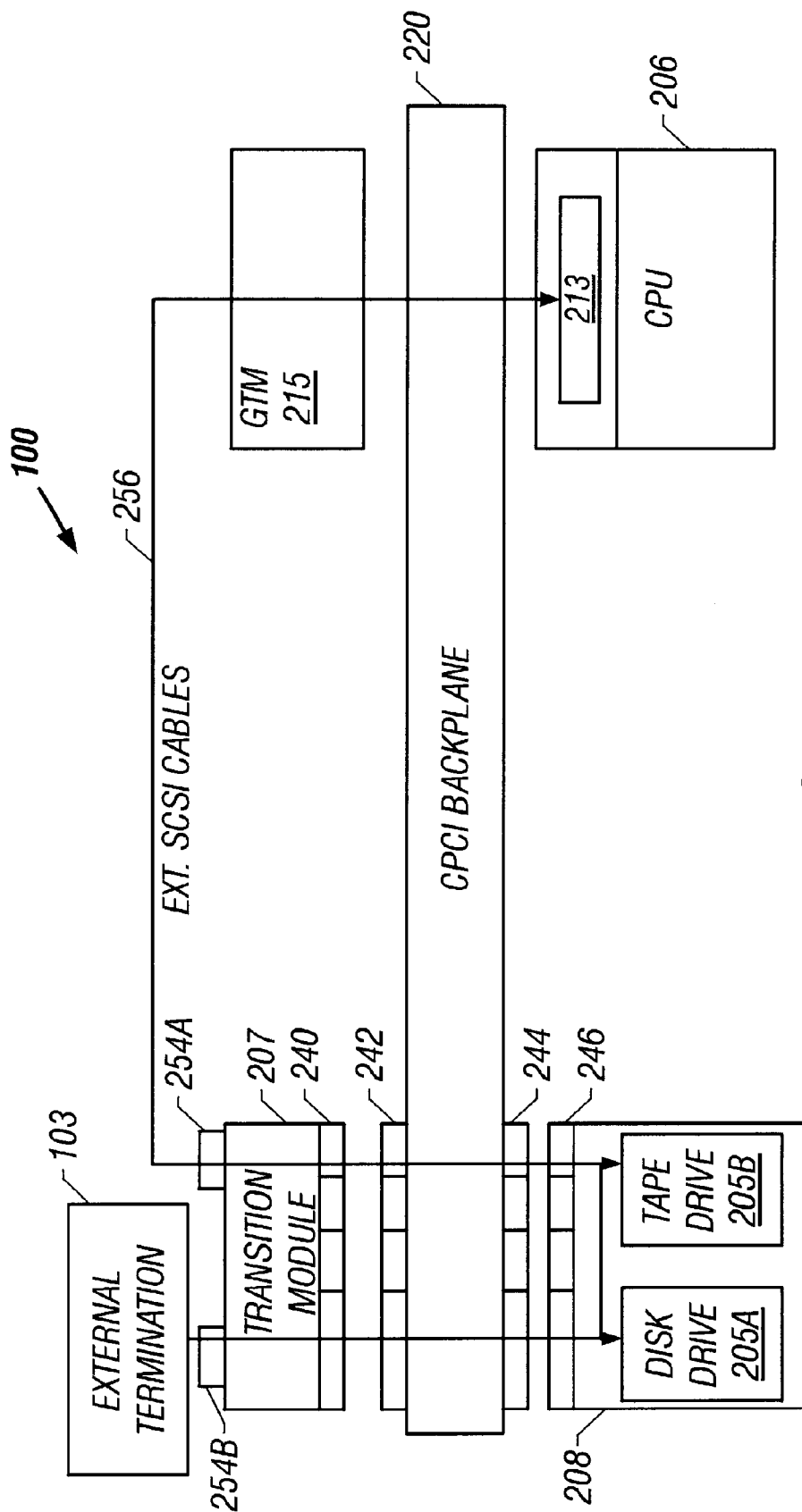
FIG. 1 depicts an exemplary storage card module arrangement using the Small Computer System Interface (SCSI) storage devices provided in accordance with the teachings of the present invention.

In the drawings, like or similar elements are designated with identical reference numerals throughout the several views thereof, and the various elements depicted are not necessarily drawn to scale. Referring now to FIG. 1, depicted therein is an exemplary storage card module arrangement 100 using the SCSI storage devices, e.g., a disk drive 205A and a tape drive 205B, provided in accordance with the teachings of the present invention. Preferably, the storage card module arrangement 100 is provided for use in a telecommunications network element, e.g., a signaling server, comprising numerous electronic components such as processors, storage devices, line interface cards, et cetera, and organized into racks and shelves. As those skilled in the art should readily recognize, these various components and associated storage devices of the equipment may be advantageously provided as highly modularized Printed Board Assemblies (PBAs) disposed on a suitably segmented high performance bus system that affords a rugged mechanical form factor in addition to hot swappability in order to increase system reliability and availability. Accordingly, the well known Compact Peripheral Component Interconnect (CPCI) standard which has emerged as the bus system of choice for ruggedized applications requiring stringent form factors while still maintaining electrical compatibility with the PCI bus standard in terms of its high performance is preferably utilized for interconnecting the various PBAs, including the storage card module of the present invention.

It is well known that although the CPCI standard is identical to the PCI standard used in PCs in terms of electrical performance, it offers a more connectorized card form factor and uses a vertically mounted backplane that is not only highly robust, but also provides access from both sides of the backplane. Typically, a card module's functional elements are provided on its front panel portion, allowing all cabling associated the particular card module to be provided as a rear side interface using a rear panel board known as a transition module (TM). Also, in typical usage, a TM is connected to its front panel card component via a mirror image of the connector interface provided through the backplane.

Furthermore, the vertical layout of the backplane provides for better cooling in the backplane chassis, an essential consideration in heat intensive applications, in addition to facilitating the mechanical aspects of live insertion/removal of cards quickly and efficiently (i.e., hot swappable).

Accordingly, the storage card module of the present invention is advantageously provided as a front panel card assembly (or tape and disk (TAD) storage card) 208 with a corresponding TM 207 for external cabling. A CPCI backplane 220 is provided with a set of front side connectors 244 and a set of rear side connectors 242 for coupling with the front panel storage card 208 and the rear side TM 207, respectively. The front panel TAD storage card 208 is provided with a card connector 246 for front side coupling. In similar fashion, the rear side TM 207 is provided with a rear module connector 240 for effectuating rear side coupling with the backplane 220.

The rear panel TM 207 is also provided with a suitable interface for effectuating SCSI bus connectivity between the SCSI storage media disposed on the front panel storage card 208 and an external SCSI controller 213 which may operate under the control of a CPU such as, e.g., processor 206. Accordingly, a controller interface 254A disposed on the rear side TM 207 couples to an external SCSI bus cable 256 which extends to a Generic TM (GTM) 215 that is associated with the front side processor card 206. Another interface 254B is disposed on the storage card TM 207 for coupling to a suitable SCSI termination 103. Those skilled in the art should readily recognize upon reference hereto that the interface 254B may also be employed for coupling to another SCSI storage card via its TM (in a daisy chain fashion) or with a mass storage device such as, e.g., a disk or tape drive, or a magneto-optic disk drive (MODD), before it is terminated. The SCSI controller functionality 213 embodied in, or associated with, the CPU 206 controls I/O operation with respect to the storage media drives 205A and 205B using the SCSI bus cabling 256 and connectorized coupling across the CPCI backplane 220.

Figure 2:
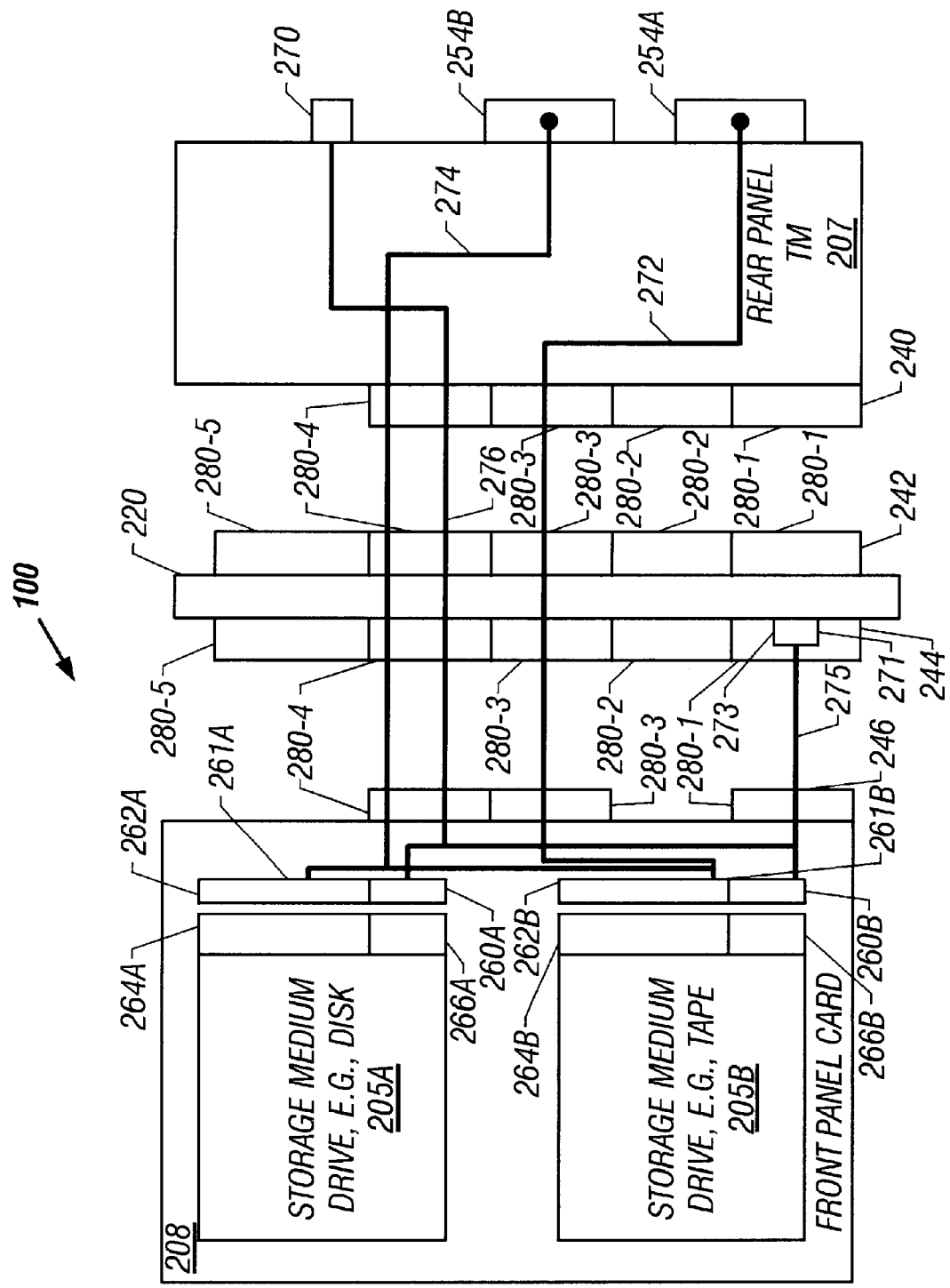
FIG. 2 depicts an exemplary electrical arrangement for connecting the SCSI storage devices in the storage card module of the present invention.

Referring now to FIG. 2, depicted therein is another view of the storage card module arrangement 100 wherein an exemplary electrical arrangement for connecting the SCSI storage devices is particularly emphasized. The front and rear side connectors, reference numerals 244 and 242, respectively, disposed on the backplane 220, in addition their respective mating connectors on the front panel card 206 (reference numeral 246) and the rear panel TM 207 (reference numeral 240) are illustrated as the CPCI-compliant connectors in this exemplary embodiment. Accordingly, the connectors disposed on each side of the backplane 220 are comprised of five individual portions, J1 through J5, reference numerals 280-1 through 280-5. Further, J1–J4 mating portions are illustratively provided as the front panel card and rear panel TM connectors in this presently preferred exemplary embodiment.

A cable connector (reference numerals 261A and 261B) that is comprised of a power connector portion and a SCSI connector portion is associated with each storage device on the front panel card 206. For example, the cable connector 261 A associated with the disk drive 205A comprises the power connector portion 260A and the SCSI connector portion 262A. In similar fashion, the cable connector 261B associated with the tape drive 205B comprises the power connector portion 260B and the SCSI connector portion 262B.

Furthermore, each storage drive is accordingly provided with suitable mate portions corresponding to these cable connectors associated therewith. With respect to the disk drive 205A (which preferably comprises a 16-bit fast-wide SCSI disk drive), therefore, a power connector mate portion 266A is provided to couple with the power connector portion 260A and an I/O connector mate portion 264A is provided for coupling with the SCSI connector portion 262A. In similar fashion, with respect to the tape drive 205B (which preferably comprises an 8-bit fast SCSI tape drive), a power connector mate portion 266B is provided to couple with the power connector portion 260B and an I/O connector mate portion 264B is provided for coupling with the SCSI connector portion 262B.

Power is distributed in the presently preferred exemplary storage card module arrangement by establishing a power receive path 275 between power pins 271 and 273 of the J1 connector portion which forms the standard 32-bit PCI bus connector and the power connector portion 260B of the tape drive 205B. Preferably, power pin 271 provides a +5.0 VDC supply and power pin 273 provides a +12.0 VDC supply. Power is then distributed to the disk drive 205A via its power connector portion 260A and is rerouted through the J4 connector portions 280-4 as a power return path 276 which is coupled to an external power connector 270 disposed on the rear panel TM 207. The external power connector 270 of the rear panel TM 207 may be advantageously utilized for providing backplane-derived power to other mass storage devices (e.g., other storage cards or MODDs etc.).

I/O bus connectivity, i.e., SCSI bus connectivity, of the storage card module is achieved by advantageously utilizing one or more user-defined connector portions, i.e., any combination of the J3 through J5 portions, of the CPCI-compliant backplane connectors. Incoming SCSI bus portion 272 emanates from the SCSI controller interface 254A disposed on the rear panel TM 207 and is routed to the storage devices on the front panel card 208 via the J3 portions 280-3 of the connectors. Preferably, the SCSI bus portion 272 is connected to the devices by stubbing off the bus and coupling through a cable coupled to the SCSI connector portions 262A and 262B, respectively. The SCSI bus portion is then rerouted through one of the user-defined connector portions, e.g., the J4 portions 280-4, of the backplane connectors 242 and 244, to the rear panel TM's other bus interface 254B which may be used to couple to the next SCSI device or a termination.

Additional details regarding the electrical arrangement of the storage card module of the present invention and an exemplary physical layout of a signaling server are provided in the following co-pending commonly assigned patent application which has been cross-referenced hereinabove and is incorporated by reference herein: "Card Design Having Tape and Disk Drives," filed Mar. 31, 2000, Ser. No.: 09/539,759, in the name(s) of: Ignacio Linares and Serge Fourcand.

Figure 3A:
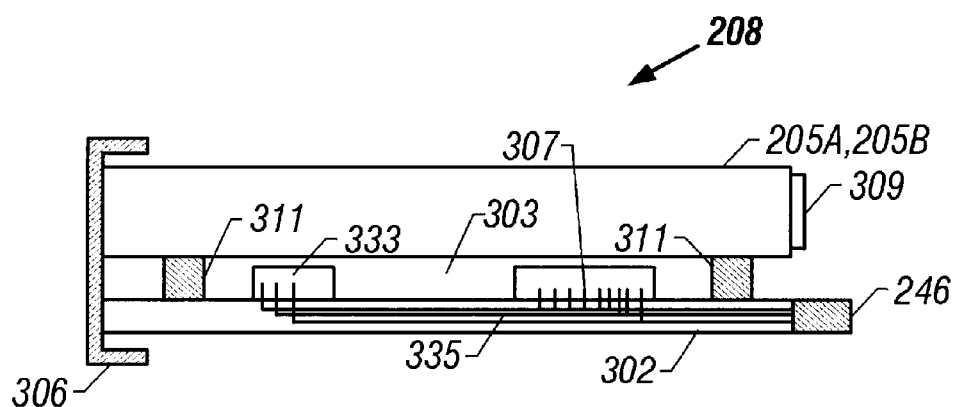
FIG. 3A depicts a cross-sectional view of an exemplary mechanical arrangement of the storage card module wherein at least one low profile connector is provided in accordance with the teachings of the present invention.

Referring now to FIG. 3A, depicted therein is a cross-sectional view of the exemplary front panel storage card 208 particularly emphasizing the mechanical arrangement of the storage devices provided in accordance with the teachings of the present invention. A printed circuit board (PCB) 302 is provided as the substrate for the storage card assembly 208, which substrate is provided with the front side card connector 246 for connecting to the backplane connector (not shown in this FIG.). The storage devices, e.g., the disk or tape drives 205A or 205B, are positioned over the PCB 302 such that a first or second predetermined spacing 303 is disposed between the respective storage drive and the PCB 302. In a presently preferred exemplary embodiment, the first and second predetermined spacings 303 preferably comprise the same width, although in certain implementations different widths may be provided for the spacings 303 in accordance herewith.

The predetermined spacings are effectuated by placing one or more spacer couplers 311 that mechanically couple the drives to the board 302 while leaving a space in between. A faceplate 306 is provided for shielding the drives and the PCB 302 when the storage card assembly 208 is mounted on a backplane in the equipment shelf.

In accordance with the teachings of the present invention, one or more low profile connectors, e.g., connector 307, are disposed in the predetermining spacing(s) 303 with respect to each storage device. Similarly, a low profile power connector 333 is also provided in the predetermined spacing 303 for supplying power to each storage device. Electrical traces 355, preferably buried in the PCB substrate, are appropriately disposed for providing an electrical path (for I/O and power) between card connector 246 at one end and the low profile connectors 307 and low profile power connectors 333 at the other end, respectively.

Those skilled in the art should readily recognize that the low profile I/O connector(s) 307 and low profile power connector(s) 333 shown in FIG. 3A exemplify and embody the SCSI connector portions 262A/262B and power connector portions 260A/260B depicted in the exemplary electrical arrangement of FIG. 2, respectively. Analogously, a device connector 309 provided with the storage device in FIG. 3A exemplifies and embodies the power connector mates 266A/266B and I/O connector mates 264A/264B of FIG. 2.

Figure 3B:
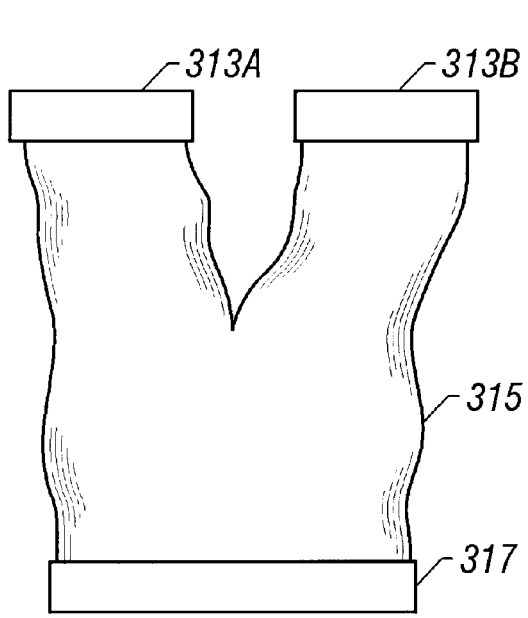
FIGS. 3B and 3C depict two exemplary ribbon cables for connecting the SCSI storage devices to the low profile connectors provided in accordance with the teachings of the present invention.
Figure 3C:
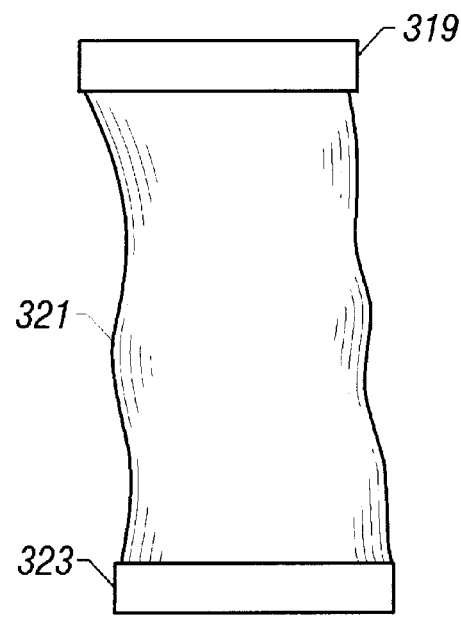

FIGS. 3B and 3C depict two exemplary ribbon cables 315 and 321 for connecting the low profile I/O connector(s) 307 to the respective storage devices in accordance with the teachings of the present invention. Since the SCSI drive 205A requires a 64-pin interface, two low profile connectors, each having 34 pins, are provided for accommodating all the necessary interface signals. Accordingly, the ribbon connector 315 is provided as a Y-forked ribbon cable, with 34-pin interfaces 313A and 313B at the low profile connector end and a 68-pin interface 317 at the disk drive end. The ribbon cable connector 321 is used for the tape drive 205B which requires a 50-pin interface. Because a low profile connector with the presently preferred pitch of 0.050 in. can support this pin count, the ribbon cable connector 321 is not forked and, accordingly, a 50-pin interface (reference numerals 319 and 323) is provided at both ends of the ribbon cable.

Figure 4A:
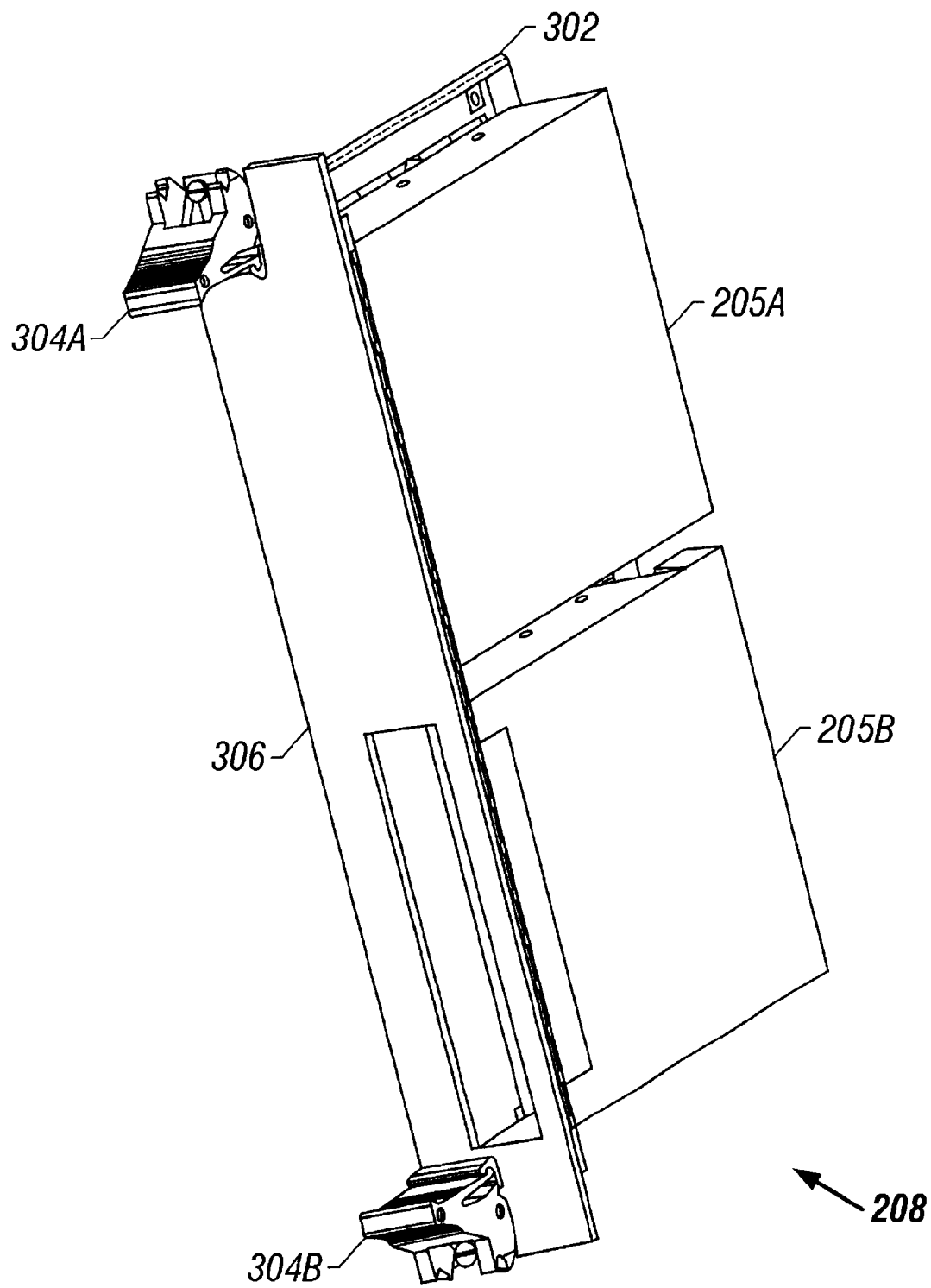
FIG. 4A depicts a perspective view of the presently preferred exemplary storage card module of the present invention.
Figure 4B:
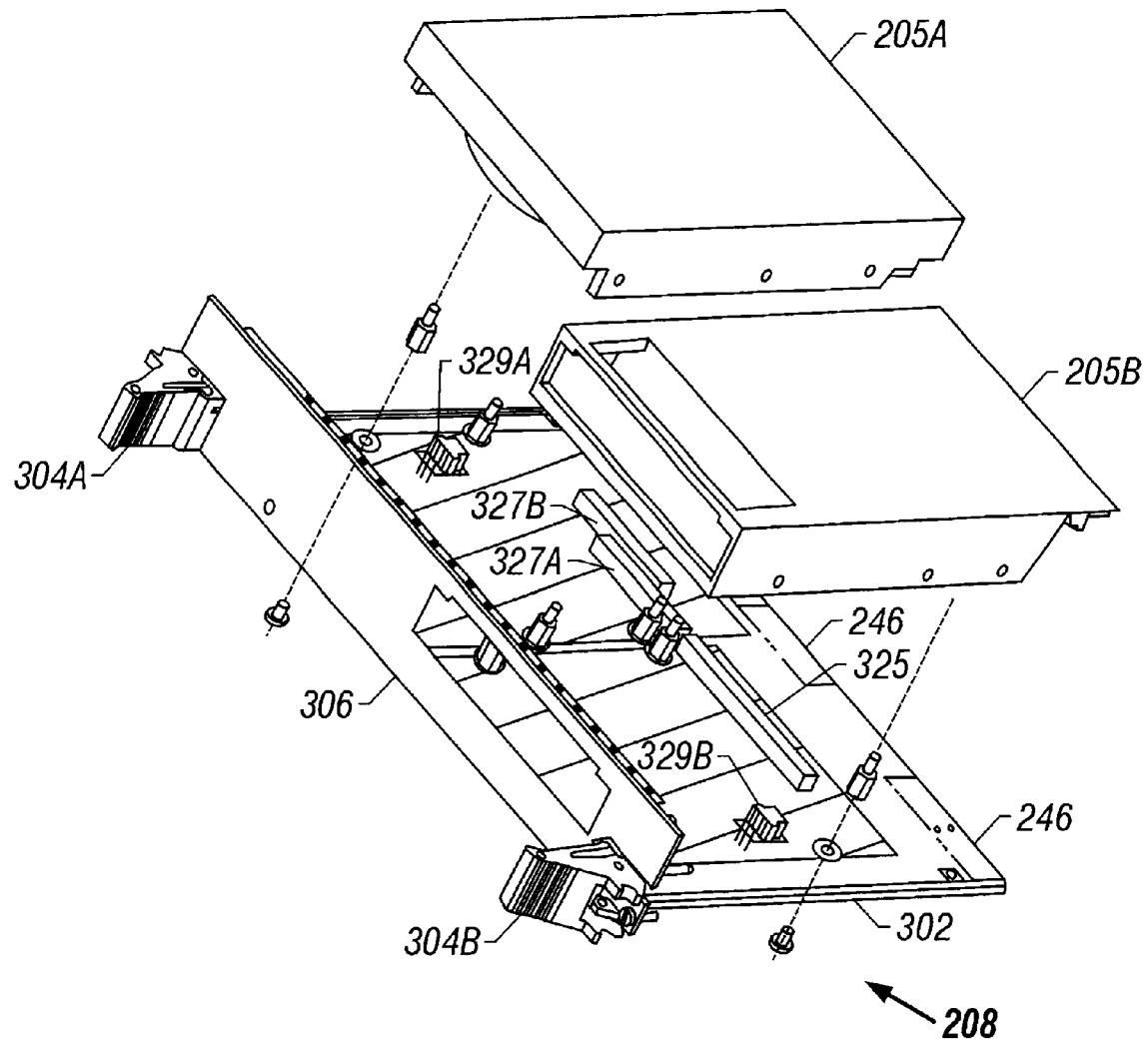
FIG. 4B depicts an exploded view of the presently preferred exemplary storage card module of the present invention.

FIGS. 4A and 4B depict a perspective view and an exploded view, respectively, of the front panel storage card assembly 208 of the presently preferred exemplary embodiment of the present invention. In the perspective view, the SCSI storage drives, reference numerals 205A and 205B, are disposed on the PCB 302 as described in greater detail hereinabove. The faceplate 306 is preferably provided with snapping means 304A and 304B (e.g., ejector levers, clips, buckles, clasps, braces, clamps, grips, etc.) for securely holding the front panel storage card assembly 208 in place (with respect to the shelf chassis) once it is inserted in its slot on the backplane. The card connector(s) 246 formed on the PCB 302 are exemplified in the exploded view shown in FIG. 4B. Two low profile power connectors, reference numerals 329A and 329B, are provided between the storage devices and the PCB 302. Preferably, 4-pin connectors are used for supplying power to the disk drive 205A and tape drive 205B from the backplane connector portion 280-1 as explained hereinabove with respect to the electrical arrangement shown in FIG. 2. A 50-pin low profile I/O connector 325 is illustrated for effectuating I/O bus connectivity between the tape drive 205B and the card connector 246 formed on the PCB 302. Similarly, two 34-pin low profile connectors, reference numerals 327A and 327B, are staggered in the spacing between the disk drive 205A and the PCB 302 for connecting to the card connector 246.

Based on the foregoing, those skilled in the art should appreciate that the present invention's storage card module arrangement advantageously overcomes the deficiencies and drawbacks found in the current I/O backplane arrangements by providing a standardized interface slot that can be used for different storage devices on "as needed" basis without extensive backplane modifications, etc. The connectorized slot can be used not only for storage cards but also for cards supporting different functionality, thereby further increasing interoperability. In addition, the present invention advantageously provides a storage card assembly that is no wider than two CPCI slots, by utilizing low profile connectors for power and I/O in the "dead" space between the drives and the substrate board, thereby economizing the backplane slot usage while achieving a desirable storage capacity on a single PBA.

It is believed that the operation and construction of the present invention will be apparent from the foregoing Detailed Description. While the apparatus shown and described has been characterized as being preferred, it should be readily understood that various changes and modifications could be made therein without departing from the scope of the present invention as set forth in the following claims. For example, although J3 and J4 portions of the CPCI connectors are utilized in the present invention, other combinations of the user-defined I/O connectors may also be used in accordance with the teachings of the present invention. Further, the usage of the SCSI devices, e.g., 16-bit fast-wide SCSI disk drive or 8-bit fast SCSI DAT drive, is illustrative rather than restrictive. Therefore, other I/O buses and storage devices compliant therewith may be provided in accordance herewith. Similarly, the pitch and pin counts used for the exemplary low profile I/O and power connectors are illustrative only and several variations therein may be implemented. Accordingly, all these numerous modifications, substitutions, additions, combinations, extensions, etc. are considered to be within the ambit of the present invention whose scope is limited solely by the following claims.

What is claimed is:

1. A storage card module, comprising:
    a printed circuit board (PCB) provided as a front panel card, said PCB supporting traces from a card connector that is matched to at least one backplane connector disposed on a backplane, wherein said at least one backplane connector is coupled to an input/output (I/O) bus interface;
    a first storage device positioned on said PCB with a first predetermined spacing disposed therebetween;
    a second storage device positioned on said PCB with a second predetermined spacing disposed therebetween;
    at least one low profile connector disposed in each of said first and second predetermined spacings, said at least one low profile connector coupling to at least a portion of said traces from said card connector; and
    a flexible ribbon cable disposed between said at least one low profile connector and a corresponding storage device for providing an electrical path therebetween.

2. The storage card module as set forth in claim 1, wherein said I/O bus interface comprises a Small Computer System Interface (SCSI) bus interface.

3. The storage card module as set forth in claim 2, wherein said first storage device comprises a disk drive.

4. The storage card module as set forth in claim 3, wherein said at least one low profile connector comprises two 34-pin low profile connectors and said flexible ribbon cable is forked at one end for connecting to said two 34-pin low profile connectors at said one end, said flexible ribbon cable connecting to said disk drive at the other end.

5. The storage card module as set forth in claim 2, wherein said second storage device comprises a tape drive.

6. The storage card module as set forth in claim 5, wherein said at least one low profile connector comprises a 50-pin low profile connector and said flexible ribbon cable connects said 50-pin low profile connector and said tape drive.

7. The storage card module as set forth in claim 2, wherein a low profile power connector is disposed in each of said first and second predetermined spacings for providing power to said first and second storage devices, and further wherein said low profile power connector receives power from said backplane.

8. The storage card module as set forth in claim 2, wherein said first storage device comprises a Compact Disc Read-Only Memory (CDROM) drive disposed on said PCB.

9. A storage card module for use in a signaling server disposed in a telecommunications network, comprising:
    a printed circuit board (PCB) having a disk drive and a tape drive thereon with a predetermined space between said PCB and said drives;
    a 50-pin low profile connector disposed between said PCB and said tape drive, said 50-pin low profile connector coupling to said tape drive via a ribbon cable;
    a pair of 34-pin low profile connectors disposed between said PCB and said disk drive, said pair of 34-pin low profile connectors coupling to said disk drive via a forked ribbon cable; and
    a pair of 4-pin low profile power connectors disposed in said predetermined space for providing power to said tape and disk drives.

10. The storage card module for use in a signaling server as set forth in claim 9, further comprising a plurality of traces buried in said PCB, said traces running between each of said low profile connectors at one end and a card connector of said PCB at the other end, wherein said card connector matches a backplane connector disposed on a backplane which complies with the Compact Peripheral Component Interconnect (CPCI) bus standard.

11. The storage card module for use in a signaling server as set forth in claim 10, wherein said backplane connector is coupled to a Small Computer System Interface (SCSI) bus interface.

12. The storage card module for use in a signaling server as set forth in claim 11, wherein said tape drive is an 8-bit fast tape drive.

13. The storage card module for use in a signaling server as set forth in claim 11, wherein said disk drive is a 16-bit fast-wide disk drive.

14. The storage card module for use in a signaling server as set forth in claim 11, wherein said ribbon cable is a thin, flexible ribbon cable.

15. The storage card module for use in a signaling server as set forth in claim 11, wherein said forked ribbon cable is a thin, flexible ribbon cable.

16. A storage card module, comprising:

a printed circuit board (PCB) having at least one storage drive disposed thereon with a predetermined spacing provided between said PCB and said at least one storage drive, said PCB supporting a plurality of traces from a card connector that is matched to a backplane connector disposed on a backplane; and at least one low profile connector disposed in said predetermined spacing for coupling to at least a portion of said plurality of traces from said card connector, wherein said at least one low profile connector is operable to be coupled to said at least one storage drive via conductor means for providing an electrical path therebetween.

17. The storage card module as set forth in claim 16, wherein said backplane connector is operable to be coupled to a Small Computer System Interface (SCSI) bus interface.

18. The storage card module as set forth in claim 16, wherein said at least storage drive is selected from the group consisting of a disk drive, a tape drive, an optical drive and a Compact Disc (CD) drive.

19. The storage card module as set forth in claim 16, wherein said at least one low profile connector is operable to receive power from said backplane.

20. The storage card module as set forth in claim 16, wherein said PCB comprises a Compact Peripheral Component Interconnect (CPCI) card.

\* \* \* \* \*